US012669161B2

(12) United States Patent
Khlistunov et al.

(10) Patent No.: US 12,669,161 B2
(45) Date of Patent: Jun. 30, 2026

(54) BEARING AND A METHOD FOR PRODUCING A BEARING

(71) Applicant: Sumitomo Riko Company Limited, Aichi (JP)

(72) Inventors: Dmitry Khlistunov, Bad Soden-Salmünster (DE); Evgenii Zotov, Bad Soden-Salmünster (DE)

(73) Assignee: Sumitomo Riko Company Limited, Aichi (JP)

( * ) Notice: Subject to any disclaimer, the term of this patent is extended or adjusted under 35 U.S.C. 154(b) by 467 days.

(21) Appl. No.: 17/892,134

(22) Filed: Aug. 22, 2022

(65) Prior Publication Data
US 2023/0099834 A1     Mar. 30, 2023

(30) Foreign Application Priority Data
Sep. 17, 2021     (DE) ..................... 10 2021 004 702.8

(51) Int. Cl.
F16F 1/38          (2006.01)
(52) U.S. Cl.
CPC .......... F16F 1/3863 (2013.01); F16F 1/3828 (2013.01)
(58) Field of Classification Search
CPC ...... F16F 1/3732; F16F 1/3863; F16F 1/3828; F16F 1/3835; F16F 1/3849; F16F 1/3821
See application file for complete search history.

(56)          References Cited

U.S. PATENT DOCUMENTS

| | | | | |
|---|---|---|---|---|
| 5,690,320 | A | * 11/1997 | Kanda ..................... | F16F 13/16 |
| | | | | 267/140.5 |
| 7,350,775 | B2 * | 4/2008 | Sato .................... | F16F 13/1445 |
| | | | | 267/140.12 |
| 8,087,647 | B2 * | 1/2012 | Endo ................... | F16F 13/1409 |
| | | | | 267/140.4 |

(Continued)

FOREIGN PATENT DOCUMENTS

| | | | | |
|---|---|---|---|---|
| CN | 108035999 | 5/2018 | | |
| CN | 107061602 B | * 10/2020 | .............. | F16F 7/108 |

(Continued)

OTHER PUBLICATIONS

"Office Action of German Counterpart Application", issued on Mar. 29, 2022, with English translation thereof, p. 1-p. 21.

(Continued)

*Primary Examiner* — Robert A. Siconolfi
*Assistant Examiner* — Mahbubur Rashid
(74) *Attorney, Agent, or Firm* — JCIPRNET

(57)          ABSTRACT
The disclosure relates to a bearing, having an inner core, an outer cage which surrounds the inner core in a radial direction, and an elastomer body which resiliently connects the inner core and the outer cage together, wherein the outer cage has an inner stop projection, wherein the inner stop projection protrudes radially inwards from an inner circumferential face of the outer cage and has an inner stop face, wherein the inner core has an outer stop projection, wherein the outer stop projection protrudes radially outwards from an outer circumferential face of the inner core and has an outer stop face which faces the inner stop face, and wherein the inner stop face and the outer stop face overlap in an axial direction. The disclosure relates further to a method for producing a bearing.

10 Claims, 12 Drawing Sheets

(56) References Cited

U.S. PATENT DOCUMENTS

| | | | |
|---|---|---|---|
| 8,573,850 B2 * | 11/2013 | Reihle | F16F 1/3835 |
| | | | 384/536 |
| 10,086,645 B2 * | 10/2018 | Liu | B60B 17/0027 |
| 10,145,442 B2 * | 12/2018 | Ditzel | F16F 13/1463 |
| 10,150,489 B2 * | 12/2018 | Otsubo | F16F 1/3828 |
| 10,465,762 B2 * | 11/2019 | Nishi | B60K 5/1208 |
| 10,894,698 B2 * | 1/2021 | Henkel | E02F 9/22 |
| 2007/0296128 A1 * | 12/2007 | Asano | F16F 1/3828 |
| | | | 267/140.12 |
| 2012/0175831 A1 | 7/2012 | Kieffer | |
| 2013/0164077 A1 * | 6/2013 | Kondor | F16F 1/3873 |
| | | | 403/221 |
| 2014/0210148 A1 * | 7/2014 | Eguchi | F16F 1/3828 |
| | | | 267/141 |
| 2017/0227084 A1 | 8/2017 | Ditzel et al. | |
| 2017/0299008 A1 * | 10/2017 | Satou | F16F 13/1409 |

FOREIGN PATENT DOCUMENTS

| | | |
|---|---|---|
| DE | 102009041549 | 3/2011 |
| DE | 102016001507 | 8/2017 |
| JP | H0567839 | 9/1993 |
| JP | 2013204801 | 10/2013 |

OTHER PUBLICATIONS

"Office Action of China Counterpart Application", issued on Nov. 6, 2025, with English translation thereof, pp. 1-13.
"The Second Office Action of China Counterpart Application", issued on Mar. 25, 2026, with English translation thereof, p. 1-p. 12.

* cited by examiner

BEARING AND A METHOD FOR PRODUCING A BEARING

CROSS-REFERENCE TO RELATED APPLICATION

This application claims the priority benefits of German application no. 10 2021 004 702.8, filed on Sep. 17, 2021. The entirety of the above-mentioned patent application is hereby incorporated by reference herein and made a part of this specification.

TECHNICAL FIELD

The disclosure relates to a bearing and a method for producing the bearing.

BACKGROUND ART

The disclosure lies in the field of component bearings, in particular in the field of elastomeric bearings. Such elastomeric bearings generally comprise an inner member, which is connected to a component, and an outer member, which is connected to another component, wherein the inner member and the outer member are mechanically coupled together via an elastomer spring. Owing to the often complex geometries of the inner member and of the outer member, extensive production steps are necessary in order in particular to provide stops for limiting the spring travels.

SUMMARY

The disclosure provides a bearing and a method for producing a bearing with reduced production complexity, reduced costs and an improved working life and noise development.

The disclosure can be achieved by providing a bearing and a method for producing a bearing according to the subject matter of the respective independent claims. Preferred embodiments are found in the dependent claims.

One aspect relates to a bearing having an inner core, an outer cage, which surrounds the inner core in a radial direction, and an elastomer body which resiliently connects the inner core and the outer cage together, wherein the outer cage has an inner stop projection, wherein the inner stop projection protrudes radially inwards from an inner circumferential face of the outer cage and has an inner stop face, wherein the inner core has an outer stop projection, wherein the outer stop projection protrudes radially outwards from an outer circumferential face of the inner core and has an outer stop face which faces the inner stop face, and wherein the inner stop face and the outer stop face overlap in an axial direction.

In particular a bearing with simplified production can thereby be made possible, wherein the bearing can preferably be produced with an axial stop by means of the inner core and the outer cage without additional components. In particular, a bearing can thereby be produced with only one vulcanization step, whereby increased production efficiency and reduced material consumption, for example, can be realized.

The bearing can in particular be configured to resiliently couple at least one first element or component with at least one second element or component and/or to transmit, preferably to transmit in a damped manner, mechanical vibrations between the at least one first element and the at least one second element. The bearing can be in the form of, for example, a vehicle bearing, e.g. an engine bearing, chassis bearing, transmission bearing and/or frame bearing. For example, the first element can be a component that is to be mounted, e.g. an engine, and the second element can be, for example, a sub-frame, a supporting bush, a bearing point and/or a bodywork part.

The inner core can be in the form of a substantially rigid, preferably one-piece inner core. In particular, efficient transmission of mechanical energy, for example in the form of mechanical vibrations from the inner core to the elastomer body, can thereby be ensured.

The inner core can preferably have at least one fastening portion, wherein the at least one fastening portion can be designed to fasten at least one first element to the inner core. The at least one fastening portion can in particular be in the form of a central bore, preferably a central through-bore, of the inner core. The central bore can have in particular a circular or oval cross section. However, the central bore is not limited thereto but can be formed with other cross sections, e.g. square. The central bore can have a first cross-sectional shape in a first portion and a second cross-sectional shape at least in a second portion, wherein the first cross-sectional shape is different from the second cross-sectional shape. Fastening of the at least one first element to the inner core can thereby preferably be improved.

The inner core can be an elongate body which has an axial direction and a radial direction. The inner core can be substantially cylindrical or hollow-cylindrical, in particular along an inner core axis. The cross-sectional shape of the inner core is not limited to a circular shape but can be of any shape, e.g. oval, lozenge-shaped, etc., along the inner core axis. The cross-sectional shape of the inner core can differ along the inner core axis.

The outer cage can be in the form of a substantially rigid outer cage. In particular, the outer cage can be formed in one piece.

The outer cage in particular has a mounting face, which can be formed by a radial outer face of the outer cage. The mounting face can be covered with a layer of a material of the elastomer body. In other words, the outer cage can be embedded at least in part in the material of the elastomer body. Via the mounting face, the outer cage can be connected to the second element or the second component, in particular by pressing. The connection between the outer cage and the second element is in particular a substantially rigid connection. However, an additional mounting element, which is connected or press-fitted to the outer cage via the mounting face, can also be provided, wherein the mounting element can in turn be connected or press-fitted to the second element or the second component. The connection between the outer cage and the mounting element and the connection between the mounting element and the second element are in particular each a substantially rigid connection. The mounting element can be an outer sleeve which in the mounted state surrounds or encloses the outer cage.

The outer cage can be an elongate body which has an axial direction and a radial direction. The outer cage, in the unloaded state, can in particular be arranged concentrically with the inner core but is not limited thereto. For example, the outer cage and the inner core, in the unloaded state, can be arranged non-concentrically, such that, in the loaded state, they are arranged concentrically with one another. In other words, the outer cage, in the unloaded state or in the loaded state, can thus be arranged in particular concentrically with the inner core. The outer cage, in particular the enveloping end thereof, can be substantially cylindrical or hollow-cylindrical, in particular along an outer cage axis.

The cross-sectional shape of the outer cage is not limited to a circular shape but can be of any desired shape, e.g. oval, lozenge-shaped, etc., perpendicular to the outer cage axis. The cross-sectional shape of the inner core can differ along the inner core axis. The mounting element, where provided, can be substantially cylindrical or hollow-cylindrical corresponding to the shape of the outer cage.

In a mounted state of the bearing, in particular in the unloaded state, the outer cage axis can be substantially parallel and/or identical to the inner core axis. In the mounted state, the outer cage axis and/or the inner core axis can in particular be substantially parallel and/or identical to a central axis of the bearing. In the mounted state, the inner core is in particular surrounded by the outer cage and/or the mounting element and is resiliently connected thereto via the elastomer body.

The outer cage surrounds the inner core in a radial direction, in particular circumferentially around the inner core axis or outer cage axis or central axis. In other words, the outer cage is designed to surround the inner core in a radial direction, in particular circumferentially around the inner core axis or outer cage axis or central axis. The outer cage can thereby in particular be configured to have a greater length along the central axis or outer cage axis than a length of the inner core along the central axis or inner core axis. The inner core can further be configured to protrude, in the mounted state, at least partially from the outer cage in the axial direction along the central axis. However, the bearing is not limited to such relative dimensions of the inner core and the outer cage but can be adapted or chosen according to the situation.

The outer cage further has an inner stop projection, in particular at least one inner stop projection, wherein the inner stop projection protrudes radially inwards, in particular radially relative to the outer cage axis or central axis, from an inner circumferential face of the outer cage. The inner stop projection is formed in particular from a substantially rigid material, such as, for example, metal or plastics material. The inner stop projection can in particular be formed in one piece with the outer cage. The outer cage with the inner stop projection can be produced from a single material in one production step, for example by metal die-casting or plastics injection molding. Good structural stability of the inner stop projection with simple production can thereby be made possible. The inner circumferential face of the outer cage can in particular be a surface of the outer cage facing the outer cage axis or the central axis, wherein the inner circumferential face can be in the form of a surface surrounding the outer cage axis or central axis at least partially or completely.

The or each inner stop projection has an inner stop face. The inner stop face can in particular be substantially perpendicular to the outer cage axis or central axis. A relative movement between the inner core and the outer cage along the central axis can thereby efficiently be blocked or limited. The inner stop face can, however, also slope at least in part, wherein a normal vector of the inner stop face points, for example, in the direction of the outer cage axis or central axis.

The inner core further has an outer stop projection, in particular at least one outer stop projection, wherein the outer stop projection protrudes radially outwards, in particular radially relative to the inner core axis or central axis, from an outer circumferential face of the inner core. The outer stop projection is formed in particular from a substantially rigid material, such as, for example, metal or plastics material. The outer stop projection can in particular be formed in one piece with the inner core. The outer stop projection can, for example, be molded as a second inner core element by plastics injection molding onto a first inner core element of the inner core, which is formed from metal. Good structural stability of the outer stop projection with simple production can thereby be made possible. The outer circumferential face of the inner core can in particular be a surface of the inner core that faces away from the inner core axis or central axis, wherein the outer circumferential face can be in the form of a surface that extends circumferentially around the inner core axis or central axis at least partially or completely.

The or each outer stop projection has an outer stop face. The outer stop face can in particular be formed substantially perpendicular to the inner core axis or central axis. A relative movement between the inner core and the outer cage along the central axis can thereby efficiently be blocked or limited. The outer stop face can, however, also slope at least in part, wherein a normal vector of the outer stop face points, for example, in a direction away from the inner core axis or central axis.

In the mounted state, the outer stop face or each outer stop face faces the inner stop face or an inner stop face. Faces in this context can be understood in particular as meaning that the outer stop face and the inner stop face can come into contact with one another in the event of a relative movement between the inner core and the outer cage along the central axis, i.e. in the axial direction. In particular, the inner stop face or each inner stop face also faces the outer stop face or an outer stop face in the mounted state. A relative movement between the inner core and the outer cage along the central axis can thereby effectively be limited or blocked. In the mounted state, a free space or gap is provided between the outer stop face and the inner stop face, wherein the axial extent of the free space or gap can correspond to the maximum axial displacement path between the inner core and the outer cage. The axial extent of the free space or gap can be smaller than the axial distance between the outer stop face and the inner stop face if elastomeric material of the elastomer body is arranged on the outer stop face and/or the inner stop face.

The inner stop face or each inner stop face and the outer stop face or each outer stop face overlap, preferably at least partially, in an axial direction. Overlap can be understood in this context as meaning that, in the mounted state, a plurality of imaginary straight lines, which are parallel to the central axis or outer cage axis or inner core axis, intersect both an inner stop face and an outer stop face. In other words, the outer stop projection or the outer stop face and the inner stop projection or the inner stop face undercut one another in an axial direction. The axial direction can be understood in this context as being a direction parallel to the central axis or outer cage axis or inner core axis. The overlap region or the amount of overlap can be sufficiently great to achieve good stop properties, in particular in respect of durability, strength and noise development. For example, a radial extent or a radial diameter of the or each overlap region between the inner stop face and the outer stop face can be more than about 3%, more than about 5% or more than about 7% of the diameter of the outer cage. A radial extent or a radial diameter of the or each overlap region between the inner stop face and the outer stop face can, however, be adapted, in particular on the basis of situation-related requirements, for example load requirements and/or characteristic curves. The bearing is thus not necessarily limited to the above ranges of the overlap region.

The inner stop face or an inner stop face can preferably be substantially parallel to the outer stop face or an outer stop face. The inner stop face or an inner stop face can further extend substantially transverse to the axial direction. Transverse in this context can be understood as meaning perpendicular to one another. In particular, a bearing with defined stop properties can thereby be provided, wherein the stop force acts only in the axial direction. Noise development during operation of the bearing can further be significantly reduced, and low component stress or high component durability can be made possible.

The inner stop face or the inner stop faces and/or the outer stop face or the outer stop faces can preferably be covered with an elastomeric material of the elastomer body. The elastomer body can in particular be in one piece. A particularly simple and/or efficient production method can thereby be made possible, as well as a long working life of the bearing. Low noise development during operation of the bearing can further be achieved. The elastomer body in the region of the inner stop face or the inner stop faces and the outer stop face or the outer stop faces can be formed during the production, in particular the injection and vulcanization of the elastomer material in the tool, by means of simple radial pushers.

The outer cage can preferably have two inner stop projections. The two inner stop projections can be formed contiguously or in one piece, provided that the inner stop projections each form an inner stop face at different positions. The two inner stop projections can protrude radially inwards from the inner circumferential face of the outer cage in particular at diametral positions. The two inner stop projections can thereby be formed substantially symmetrically with respect to the central axis or the outer cage axis. The respective inner stop faces of the two inner stop projections can be arranged in a common plane perpendicular to the central axis or outer cage axis.

The inner core can preferably have two outer stop projections. The two outer stop projections can be formed contiguously or in one piece, provided that the outer stop projections each form an outer stop face corresponding to the inner stop faces at different positions. The two outer stop projections can protrude radially outwards from the outer circumferential face of the inner core in particular at diametral positions. The two outer stop projections can thereby be formed substantially symmetrically with respect to the central axis or the inner core axis. The respective outer stop faces of the two outer stop projections can be arranged in a common plane perpendicular to the central axis or inner core axis.

In particular, the outer stop projections, in particular in the mounted state, can protrude radially outwards from the outer circumferential face of the inner core at diametral positions corresponding to the inner stop projections. In particular, inner stop faces and outer stop faces that face one another can overlap in the axial direction. In other words, the inner stop faces and outer stop faces associated with or facing one another can be arranged at diametral positions or substantially symmetrically with respect to the central axis, the outer cage axis or the inner core axis.

In particular uniform axial support of the bearing, in particular in the case of mutual abutment of respective inner stop faces and outer stop faces, can thereby be achieved. The generation of a torque, such as, for example, in the case of relative tilting of the inner core and the outer cage, can further be avoided or prevented or reduced with such mutual abutment.

The inner core and the outer cage preferably do not undercut one another or overlap in an opposite axial direction, which is opposed to the axial direction in which the inner stop face or the inner stop faces face one another. In other words, the inner core and the outer cage are preferably free of undercutting in an opposite axial direction which is opposed to the axial direction in which the inner stop face or the inner stop faces are facing. This means that, in the mounted state, imaginary straight lines which are parallel to the central axis or outer cage axis or inner core axis and intersect both an inner stop face and an outer stop face can preferably intersect the outer cage only in the corresponding inner stop projection and the inner core only in the corresponding outer stop projection. Simplified production of the bearing can thereby be made possible. In particular, the inner core can be inserted into the outer cage during production of the bearing linearly and without rotation from one end of the outer cage. The inner core and the outer cage can thus be inserted in a simple manner, for example, into an injection molding tool or vulcanization tool.

The outer cage can preferably have a window portion radially on the outside relative to the outer stop projection, preferably to each outer stop projection. The or each window portion can in particular be in the form of an aperture in or through-opening through the outer cage. The or each window portion can in particular be designed so that each outer stop projection is exposed radially on the outside through the respective window portion. The insertion of radial pushers can thereby be made possible in particular during production of the bearing, in particular during forming of the elastomer body. The elastomeric material can thus simply be formed in the desired shape in the region of the inner stop projection and/or the outer stop projection. In particular, the or each window portion can be arranged adjacent, preferably directly adjacent, to an inner stop projection of the outer cage, whereby the elastomer body can be formed on the inner stop projection, in particular on the inner stop face, simply by means of a radial pusher in the injection molding tool or vulcanization tool.

The or each outer stop projection can preferably have at its radial end an outer radial stop face. The or each outer radial stop face can preferably be covered with an elastomeric material of the elastomer body. An additional radial stop of the inner core, for example, can thereby be made possible in a simple manner. In the event of a radial displacement of the inner core relative to the outer cage, the outer radial stop face can abut a radial inner face of the second element or second component or a radial inner face of the mounting element, for example of the outer sleeve. The maximum radial displacement path of the inner core relative to the outer cage can thus be adjusted. By means of the elastomeric material on the outer radial stop face, the stop properties, in particular in respect of durability and noise development, can be improved.

The elastomer body can preferably cover substantially the entire inner circumferential face of the outer cage or be arranged substantially along the entire inner circumferential face of the outer cage. The elastomer body can preferably cover substantially the entire outer circumferential face of the inner core or be mounted substantially along the entire outer circumferential face of the inner core. A lasting or durable fastening of the elastomer body to the inner core or outer cage can thereby be ensured.

The elastomer body can in particular be formed in one piece. The elastomer body can in particular be formed in a single production step, e.g. a single injection molding, overmolding or vulcanization step. Both simple production of the bearing and high durability of the bearing can thereby be made possible.

The elastomer body can in particular have a plurality of spring arms, for example two or four spring arms, which are arranged between the inner circumferential face of the outer cage and the outer circumferential face of the inner core. The plurality of spring arms can in particular be designed to transmit and/or damp mechanical vibrations between the inner core and the outer cage. In particular spring and/or vibration damping properties of the bearing can thereby be adapted by, for example, the number, configuration, orientation and/or relative arrangement of the plurality of spring arms. The elastomer body is, however, not limited to a geometry based on spring arms but can also be configured in accordance with other geometries, for example as a conical elastomer body or as an elastomer body with conical spring portions.

The outer cage and/or the inner core can in particular be substantially axially symmetrical. Production of the bearing can thereby be simplified, for example by a simplified relative alignment of the inner core and/or the outer cage.

The inner core can be formed in particular from a rigid material, for example a plastics material, metal or composite material. In particular, the inner core can have at least a first inner core element and a second inner core element. The second inner core element can in particular enclose or surround the first inner core element radially relative to the inner core axis or central axis. The second inner core element can, for example, be injection molded, adhesively bonded, fastened by fastening elements and/or pressed onto the first inner core element. For example, the first inner core element can be produced from a metal, e.g. aluminum. For example, the second inner core element can be produced from a plastics material. An inner core can thereby be produced efficiently, and mechanical properties of the inner core can be chosen or adapted according to the situation.

In particular, the first inner core element can have at least one fixing groove, wherein the second inner core element is received at least in part in the at least one fixing groove or at least partially fills the at least one fixing groove. Alternatively or additionally, the first inner core element can have at least one fixing projection, wherein the second inner core element at least partially surrounds or encloses the at least one fixing projection. The fixing groove can in particular be open on one side or on both sides in the axial direction. The fixing groove can in particular be in the form of a through-groove which is open on both sides. In other words, the fixing groove can extend parallel to the inner core axis and/or the central axis along the entire axial length of the inner core, i.e. from a first axial end of the inner core to a second axial end of the inner core along the inner core axis or the central axis. The inner core and/or the first inner core element can thereby be produced particularly simply and efficiently in an extrusion process, for example. Furthermore, the at least one fixing groove and/or the at least one fixing projection can be formed at least in part substantially circumferentially around the inner core axis or central axis and/or at least in part substantially parallel to the inner core axis or central axis. The inner core can in particular be formed such that the first inner core element and the second inner core element form at least one common fixing face in a region around the at least one fixing groove and/or around the at least one fixing projection. The fixing groove can in particular be open in the axial direction on one side or on both sides in order to be able to form the fixing face. The at least one common fixing face can be formed, for example, substantially perpendicular to the inner core axis and/or central axis. Each fixing face can in particular be arranged along an end face of the inner core perpendicular to the central axis or inner core axis. In particular, the first inner core element and the second inner core element can be designed to lie with the at least one common fixing face against a fastening element so as to block a relative axial movement between the first inner core element and the second inner core element. The fastening element can in particular be designed to fasten the inner core to the first element or the first component. The fastening element can in particular be a fastening screw or a fastening bolt, for example, wherein the first inner core element and the second inner core element can be designed to lie with the at least one common fixing face against, for example, a head portion of the fastening screw or of the fastening bolt.

Preferably, the bearing can further have a mounting element, wherein the outer cage can in particular be configured so that it can be fastened to or in the mounting element. In particular, the mounting element can be of hollow-cylindrical form, wherein the outer cage can be capable of being fastened, in particular pressed, in the hollow-cylindrical mounting element. In particular, the mounting element can radially enclose or surround the outer cage. Preferably, the mounting element can close the window portions radially on the outside, wherein in particular the outer radial stop faces are designed to come into contact with the mounting element in the event of a relative radial movement between the outer cage and the inner core so as to block or limit such a relative radial movement. In particular, particularly efficient mounting of the bearing and low noise development can thereby be made possible. In particular, the outer cage can configured so that it can be pressed into the mounting element, but other connecting methods, for example by adhesive bonding and/or screwing, can also be used. In particular, the mounting element can be designed to pre-compress or calibrate the outer cage, and thus also the elastomer body, at least partially. In particular the resilient properties of the bearing or of the elastomer body can thereby efficiently be adjusted. The second element or the second component can be capable of being fastened to the mounting element, in particular by means of press-fitting. The mounting element can be an outer sleeve. The mounting element can also be part of the second element. The mounting element can thus be formed in one piece with the second element, for example, or configured so that it can be fastened to the second element. For example, the mounting element can be a cylindrical sleeve which forms part of a sub-frame of a vehicle.

The outer cage can have at least one inner radial stop projection. The inner radial stop projection can in particular be formed so as to be offset from the inner stop projection in the circumferential direction and/or in the axial direction. In particular, a pair of inner radial stop projections can be provided, which is preferably arranged offset by about 90° in the circumferential direction relative to a pair of outer stop projections or a pair of inner stop projections or a pair of window portions. The inner radial stop projection can in particular be designed to limit or block a relative radial movement between the inner core and the outer cage in a predetermined radial direction. The elastomer body or the elastomeric material of the elastomer body can in particular at least partially cover the at least one inner radial stop projection or be arranged thereon. In particular, efficient limiting of a relative radial movement between the inner core and the outer cage can thereby be achieved, and an increased working life or durability of the bearing can be made possible.

Each inner radial stop projection can in particular be formed so as to extend at least in part parallel to the outer cage axis or central axis. Each inner radial stop projection can further have a length parallel to the outer cage axis or central axis of at least 10%, preferably at least 40%, further preferably of at least 50%, and/or of not more than 100%, preferably not more than 80%, of a length of the outer cage along the outer cage axis or central axis.

Preferably, the bearing can be configured so that any imaginary line or straight line, in particular which intersects the outer cage and/or the inner core parallel to the central axis or inner core axis or outer cage axis, either intersects only the outer cage or intersects only the inner core or intersects only an inner stop projection and an outer stop projection. Particularly simple production of the bearing can thereby be made possible.

The inner core can in particular have at least one first inner core aperture, wherein the at least one first inner core aperture can be designed to accommodate the elastomer body or an elastomeric material of the elastomer body at least in part. In particular, the at least one first inner core aperture can be designed such that a maximum wall thickness of the inner core is below a first predetermined threshold value. It is thereby possible to avoid or reduce in particular, for example, undesirable deformation of the inner core during production of the inner core, for example during cooling and/or curing of the inner core after injection molding. The first predetermined threshold value can be specified in particular in dependence on, for example, a material of the inner core and/or a type of production of the inner core. The at least one first inner core aperture can in particular be in the form of at least one first bore or aperture. The at least one first inner core aperture can in particular be oriented substantially parallel to the central axis or inner core axis. The at least one first inner core aperture can in particular be formed in the outer stop projection, preferably in each outer stop projection. The at least one first inner core aperture can in particular be open to a side of the respective outer stop projection that is opposite the outer stop face. In particular, a continuous outer stop face can thereby be made possible, whereby the structural stability of the bearing can be increased.

The inner core can have in particular at least one, preferably for example three, first inner core ribs. The first inner core ribs can be formed by one or more first inner core apertures. The at least one first inner core rib can be designed in particular to be adjacent to the outer stop projection. It is thereby possible, for example, to increase a wall thickness of the outer stop projection and/or to avoid or reduce undesirable deformation of the inner core or of the outer stop projection during production and/or use of the inner core or of the bearing. The at least one first inner core rib can in particular be oriented substantially parallel to the central axis or inner core axis. The at least one first inner core rib can thereby be formed in particular on the outer stop projection, preferably on each outer stop projection. The at least one first inner core rib can thereby in particular be configured to be adjacent to a side of the respective outer stop projection that is opposite the outer stop face. In particular, a continuous outer stop face can thereby be made possible, whereby the structural stability of the bearing can be increased.

The outer cage can in particular have at least one first outer cage aperture, wherein the at least one first outer cage aperture can be designed to accommodate the elastomer body or an elastomeric material of the elastomer body at least in part. In particular, the at least one first outer cage aperture can be designed such that a maximum wall thickness of the outer cage is below a second predetermined threshold value. It is thereby possible to avoid or reduce in particular, for example, undesirable deformation of the outer cage during production of the outer cage, for example during cooling and/or curing of the outer cage after injection molding. The second predetermined threshold value can be specified in particular in dependence on, for example, a material of the outer cage and/or a type of production of the outer cage. The at least one first outer cage aperture can in particular be in the form of at least one second bore or aperture. The at least one first outer cage aperture can in particular be oriented substantially parallel to the central axis or outer cage axis. The at least one first outer cage aperture can in particular be formed in the inner stop projection, preferably in each inner stop projection. The at least one first outer cage aperture can in particular be open to a side of the respective inner stop projection that is opposite the inner stop face. In particular, a continuous inner stop face can thereby be made possible, whereby the structural stability of the bearing can be increased.

The outer cage can have in particular at least one, preferably for example three, first outer cage ribs. The first outer cage ribs can be formed by one or more first outer cage apertures. The at least one first outer cage rib can be designed in particular to be adjacent to the inner stop projection. It is thereby possible, for example, to increase a wall thickness of the inner stop projection and/or to avoid or reduce undesirable deformation of the outer cage or of the inner stop projection during production and/or use of the outer cage or of the bearing. The at least one first outer cage rib can in particular be oriented substantially parallel to the central axis or outer cage axis. The at least one first outer cage rib can thereby be formed in particular on the inner stop projection, preferably on each inner stop projection. The at least one first outer cage rib can thereby in particular be configured to be adjacent to a side of the respective inner stop projection that is opposite the inner stop face. In particular, a continuous inner stop face can thereby be made possible, whereby the structural stability of the bearing can be increased.

The outer cage can have in particular at least one second outer cage aperture, wherein the at least one second outer cage aperture can be designed to accommodate the elastomer body or an elastomeric material of the elastomer body at least in part. In particular, the at least one second outer cage aperture can be designed such that a maximum wall thickness of the outer cage is below a third predetermined threshold value. The third predetermined threshold value can in particular correspond to the second predetermined threshold value. It is thereby possible in particular to avoid or reduce, for example, undesirable deformation of the outer cage during production of the outer cage, for example during cooling and/or curing of the outer cage after injection molding. The third predetermined threshold value can be specified in particular in dependence on, for example, a material of the outer cage and/or a type of production of the outer cage. The at least one second outer cage aperture can in particular be designed as at least one third bore or aperture. The at least one second outer cage aperture can in particular be oriented substantially parallel to the central axis or outer cage axis. The at least one second outer cage aperture can in particular be formed in the inner radial stop projection, preferably in each inner radial stop projection.

One aspect relates to a method for producing a bearing. The bearing can in particular have any desired combination of the features described herein for a bearing.

The method comprises providing an inner core, wherein the inner core has an outer stop projection, wherein the outer stop projection protrudes radially outwards from an outer circumferential face of the inner core and has an outer stop face. The inner core can in particular have any desired combination of the features described and/or shown herein for an inner core.

The method further comprises providing an outer cage, wherein the outer cage has an inner stop projection, wherein the inner stop projection protrudes radially inwards from an inner circumferential face of the outer cage and has an inner stop face. The outer cage can in particular have any desired combination of the features described and/or shown herein for an outer cage.

The method further comprises inserting the inner core and the outer cage into a tool, such that the outer stop face and the inner stop face face one another and overlap in an axial direction.

The method further comprises forming an elastomer body between the inner core and the outer cage in the tool. Forming can in particular comprise overmolding the inner core and the outer cage with an elastomeric material and then vulcanizing the elastomeric material so as to form the elastomer body, which resiliently connects the inner core and the outer cage together.

Preferably, forming of the elastomer body can comprise a single vulcanization step.

Preferably, the insertion of the inner core and of the outer cage can comprise a substantially linear relative movement between the inner core and the hollow-cylindrical outer sleeve in the radial direction. A particularly simple process for producing the bearing can thereby be made possible. The insertion of the inner core and of the outer cage can further comprise a relative rotational movement between the inner core and the outer cage about an axis parallel to the central axis or inner core axis or outer cage axis Preferably, the insertion of the inner core and of the outer cage into the tool can comprise introducing at least one pusher in a radial direction relative to the central axis or inner core axis or outer cage axis. A pusher can in particular be introduced in a radial direction into each window portion.

BRIEF DESCRIPTION OF THE DRAWINGS

The present disclosure will further be described by exemplary embodiments which are shown illustratively in drawings. These embodiments shown illustratively are, however, not to be understood as being limiting. In the drawings.

DESCRIPTION OF EMBODIMENTS

Figure 1A:
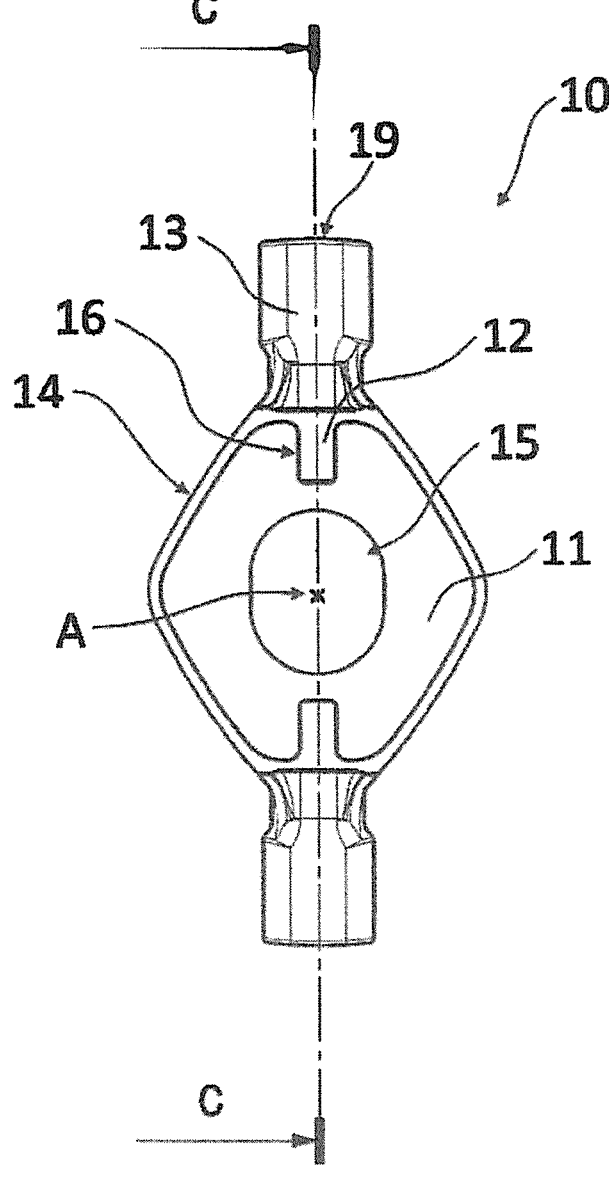
FIG. 1A is a cross-sectional view of an exemplary inner core, perpendicular to an inner core axis.
Figure 1B:
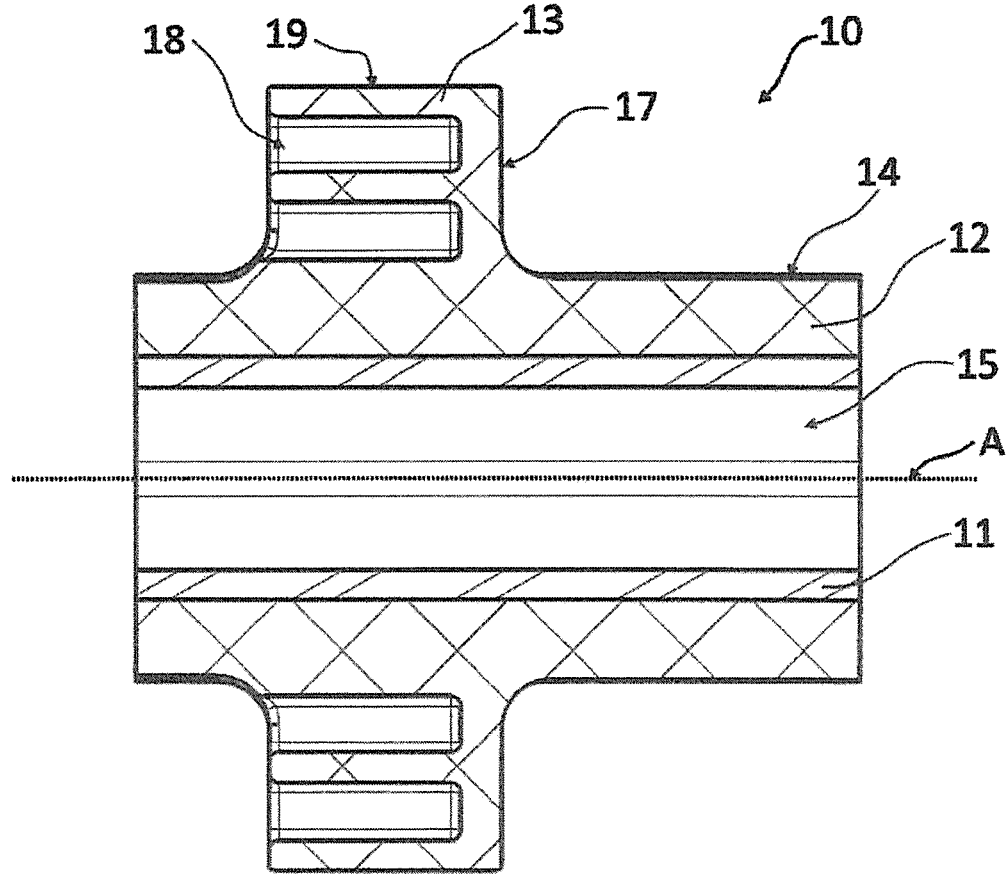
FIG. 1B is a cross-sectional view of the exemplary inner core from FIG. 1A along the sectional plane C-C.

FIG. 1A is a cross-sectional view of an exemplary inner core 10, perpendicular to an inner core axis A, while FIG. 1B is a cross-sectional view of the exemplary inner core 10 along the sectional plane marked C-C in FIG. 1A.

The inner core 10 has in particular two outer stop projections 13. The outer stop projections 13 in particular protrude radially outwards from an outer circumferential face 14 of the inner core 10 and each have an outer stop face 17.

The inner core 10 is here in the form of a substantially rigid, axially symmetrical inner core 10. The inner core 10 is further formed substantially in the shape of a hollow cylinder along the inner core axis A and has a substantially lozenge-shaped cross section. In particular, such a lozenge-shaped cross section allows transmission properties of vibration energy from the inner core 10 to the elastomer body 40 (not shown) to be set particularly efficiently and high stability of the inner core 10 to be achieved.

The inner core 10 has a first inner core element 11 and a second inner core element 12. The second inner core element 12 surrounds or encloses the first inner core element 11 radially relative to the inner core axis A. The second core element 12 is here by way of example injection-molded onto the first inner core element 11. For example, the first inner core element 11 is produced from a metal, in particular aluminum, and the second inner core element 12 is produced from a plastics material. The inner core 10 can thereby be produced efficiently, and mechanical properties of the inner core 10 can be chosen or adapted according to the situation.

In particular, the first inner core element 11 has two fixing grooves 16, in particular arranged diametrally relative to the inner core axis A, wherein the second inner core element 12 is accommodated at least in part in the two fixing grooves 16 or at least partially fills the at least two fixing grooves. In the exemplary embodiment shown, the fixing grooves 16 are formed substantially parallel to the inner core axis A and are open on both sides. A good hold between the first inner core element 11 and the second inner core element 12 can thereby be made possible. In particular, by the provision of the fixing grooves 16, both the first inner core element 11 and the second inner core element 12 can be fixed jointly in the axial direction, for example by a screw head.

The outer stop projections 13 are in particular formed in one piece with the inner core 10 or with the second inner core element 12. Good structural stability of the outer stop projections 13 can thereby be made possible. The outer circumferential face 14 of the inner core 10 is a surface of the inner core 10 that faces away from the inner core axis A, wherein the outer circumferential face 14 is in the form of a surface extending circumferentially around the entire inner core axis A.

Each outer stop projection 13 has an outer stop face 17. Each outer stop face 17 is formed in particular substantially perpendicular to the inner core axis A. A relative movement between the inner core 10 and the outer cage 20 along the inner core axis A or the central axis can thereby efficiently be blocked or limited.

The inner core 10 further has a fastening portion 15, wherein the fastening portion 15 is designed to fasten at least a first element, for example via a mounting screw, to the inner core 10. The fastening portion 15 is in particular in the form of a central through-bore of the inner core 10. The fastening portion 15 or the central bore has, for example, an oval cross section.

The inner core 10 further has at least one, for example four, first inner core apertures 18. The first inner core apertures 18 are designed to accommodate the elastomer body 40 or an elastomeric material of the elastomer body 40 at least in part. A particularly secure connection between the inner core 10 and the elastomer body 40 can thereby be achieved. The first inner core apertures 18 are in particular designed as first bores oriented substantially parallel to the inner core axis A. The first inner core apertures 18 are in particular formed in each outer stop projection 13 and in particular are open to a side of the respective outer stop projection 13 that is opposite the outer stop face 17.

In particular, each outer stop projection 13 further has at its radial end an outer radial stop face 19.

Figure 2A:
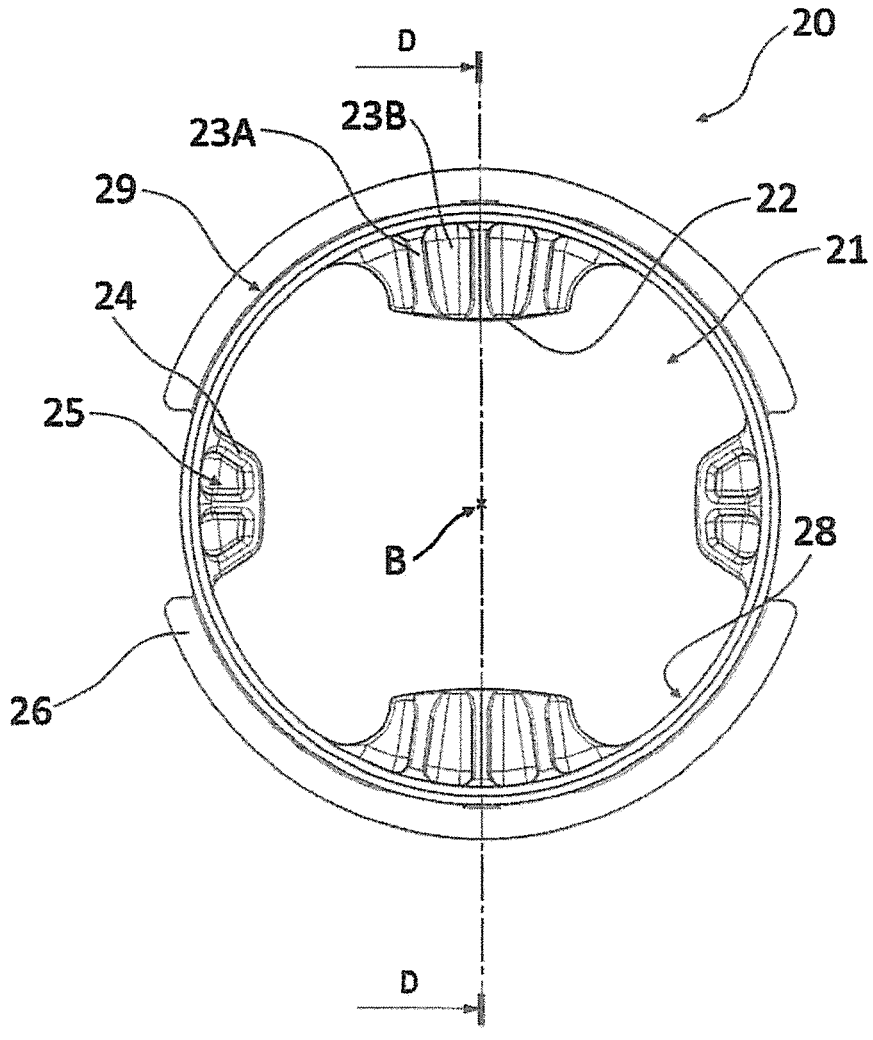
FIG. 2A is a cross-sectional view of an exemplary outer cage, perpendicular to an outer cage axis.
Figure 2B:
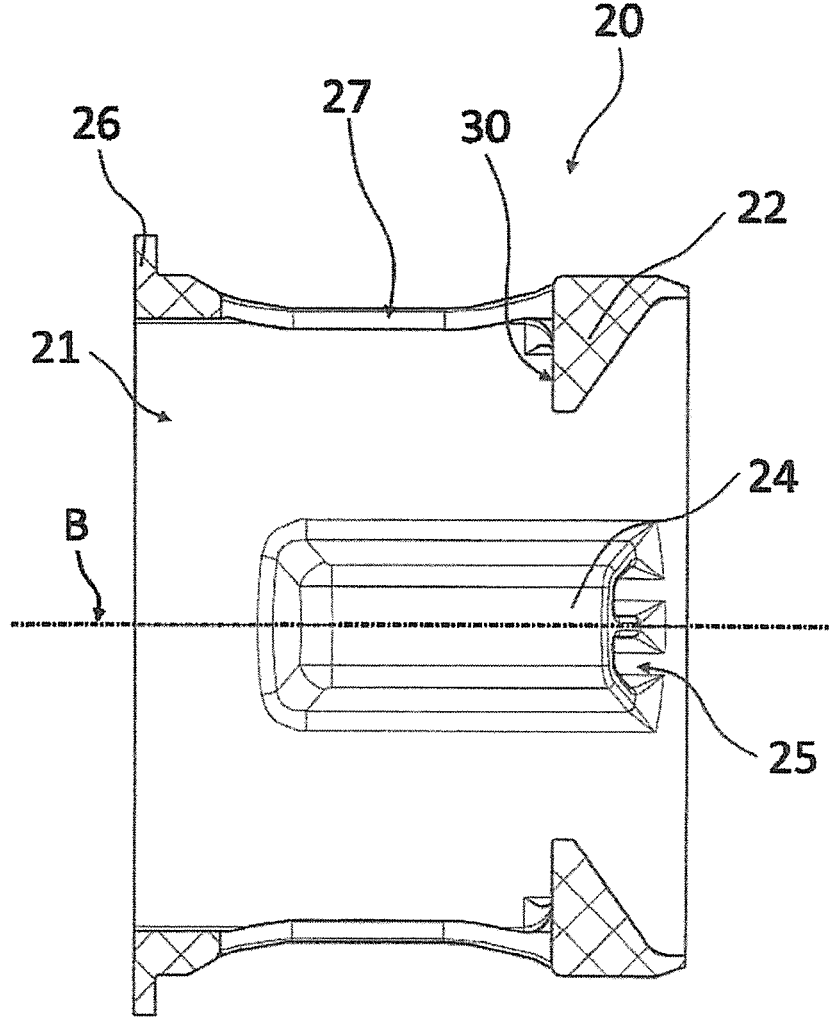
FIG. 2B is a perspective cross-sectional view of the exemplary outer cage from FIG. 2A along the sectional plane D-D.

FIG. 2A is a cross-sectional view of an exemplary outer cage 20, perpendicular to an outer cage axis B, while FIG. 2B is a cross-sectional view of the exemplary outer cage 20 along the sectional plane marked D-D in FIG. 2A.

The outer cage 20 is in the form of a substantially rigid, one-piece outer cage 20, wherein the outer cage 20 is designed to be substantially axially symmetrical. The outer cage 20 can be formed in particular from a rigid material, for example a metal, plastics material and/or composite material. The outer cage 20 is further in particular of hollow-cylindrical form along the outer cage axis B and has a central inner core receiver 21 for receiving the inner core, for example inner core 10.

The outer cage 20 has, for example, two inner stop projections 22 arranged in particular diametrally with respect to the outer cage axis B, wherein each inner stop projection 22 protrudes radially inwards in the direction of the outer cage axis B from an inner circumferential face 28 of the outer cage 20 and has an inner stop face 30 which is formed substantially perpendicular to the outer cage axis B. The inner circumferential face 28 of the outer cage 20 is a surface of the outer cage 20 that faces the outer cage axis B, wherein the inner circumferential face 28 is in the form of a surface which extends circumferentially around the entire outer cage axis B. Each inner stop projection 22 is formed in one piece with the outer cage 20.

The outer cage 20 further has a window portion 27 located radially on the outside relative to each outer stop projection 22. In particular, each window portion 27 is in the form of an aperture in or through-opening through the outer cage 20 and is designed so that each outer stop projection 22 is exposed radially on the outside through the respective window portion 27. The insertion of radial pushers in particular during the production of the bearing 1, in particular during the forming of the elastomer body 40, can thereby be made possible.

The outer cage 20 further has two inner radial stop projections 24. Each inner radial stop projection 24 is in particular formed offset in the circumferential direction about the outer cage axis B from the inner stop projections 22, in the present case by about 90°. Each inner radial stop projection 24 is designed to limit or block a relative radial movement between the inner core 10 and the outer cage 20.

The outer cage 20 further has at least one, in particular three, first outer cage ribs 23A. The first outer cage ribs 23A are formed, for example, by multiple, in particular four, first outer cage apertures 23B. The first outer cage ribs 23A are in particular designed to be adjacent to the inner stop projection 22 (or the first outer cage apertures 23B are formed in the inner stop projection 22), whereby the strength of the inner stop projection 22 is increased and undesirable deformation of the outer cage 20 or of the inner stop projection 22 during production and/or use of the outer cage 20 or of the bearing 1 is avoided or reduced. The first outer cage ribs 23A are oriented substantially parallel to the outer cage axis B. The first outer cage ribs 23A are formed in each inner stop projection 22. The first outer cage ribs 23A are formed adjacent to a side of the respective inner stop projection 22 that is opposite the inner stop face 30.

The outer cage 20 has at least one, in particular four, second outer cage apertures 25, wherein the second outer cage apertures 25 are designed to accommodate the elastomer body 40 or an elastomeric material of the elastomer body 40 at least in part. The second outer cage apertures 25 are designed as third bores or apertures and are oriented substantially parallel to the outer cage axis B. The second outer cage apertures 25 are formed in each inner radial stop projection 24.

The outer cage 20 can further have a limiting flange 26. The limiting flange 26 is divided by way of example into two limiting flange portions of equal size, but can preferably also be in the form of one or more limiting flange portions. The limiting flange 26 can in particular be arranged at an axial end, preferably an axial end facing the inner stop faces 30, of the outer cage 20. The limiting flange 26 can further protrude radially outwards relative to the outer cage axis B from an outer circumferential face 29 of the outer cage 20, in particular beyond the outer circumferential face of the mounting element 50 described hereinbelow. The limiting flange 26 limits the depth to which the outer cage 20 can be pressed into the mounting element 50, and can further limit the depth to which the mounting element 50 or the bearing 1 can be pressed in the second element during mounting. The pressing-in operation can thereby be simplified. The limiting flange 26 can further be designed to absorb, at least partially, axial forces acting along the central axis C in an operating state of the bearing 1 or to counteract axial forces acting along the central axis C. Such axial forces can occur, for example, when the outer stop projection 13 and the inner stop projection 22 come into contact or abutment. By means of the limiting flange 26, the outer cage 20 can better be supported on the mounting element 50 in the case of such impact loads. In particular, push-out forces on the outer cage 20, which occur in particular substantially parallel to the central axis C on abutment, can efficiently be absorbed by the limiting flange 26 and the mounting element 50 so as thus to prevent the bearing 1 from being undesirably pushed out or displaced during operation of the bearing 1. The efficiency and/or working life, for example, of the bearing 1 or bearing assembly can thereby be increased.

Figure 3A:
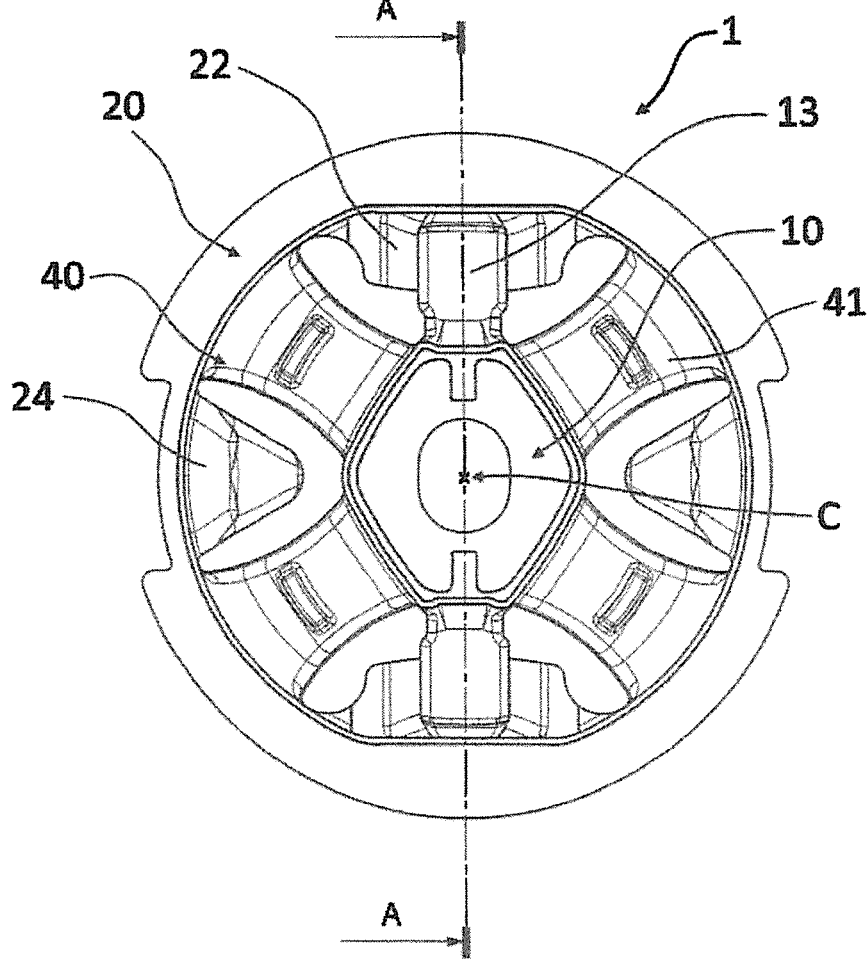
FIG. 3A is a perspective view of an exemplary bearing with an inner core, an outer cage and an elastomer body.
Figure 3B:
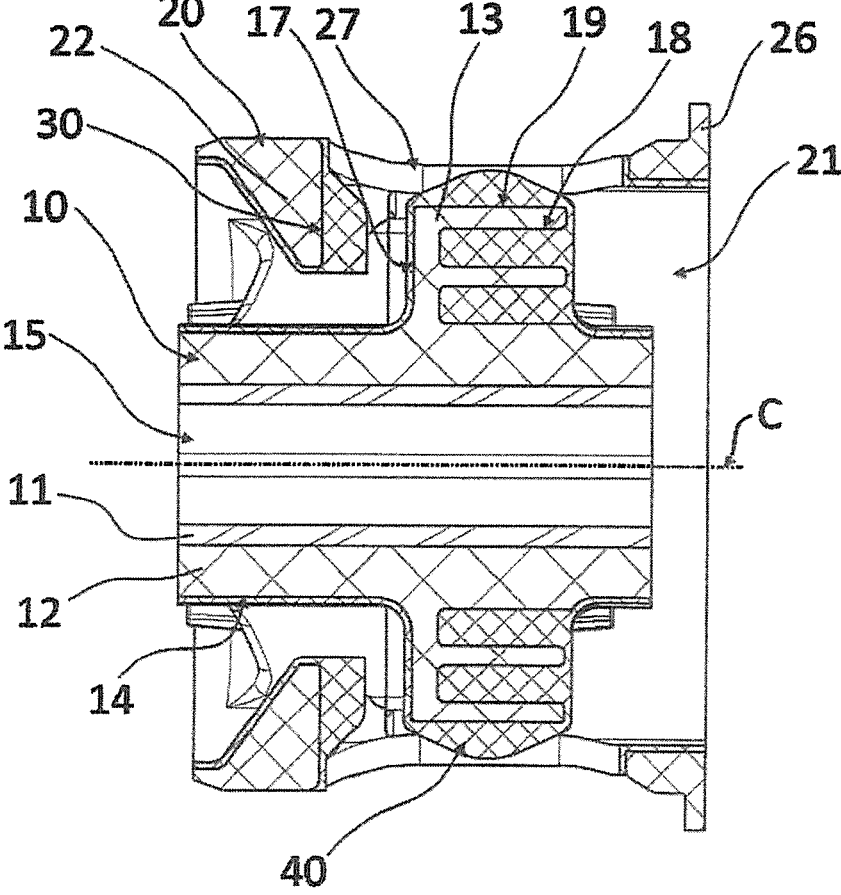
FIG. 3B is a cross-sectional view of the exemplary bearing from FIG. 3A along the sectional plane A-A.
Figure 3C:
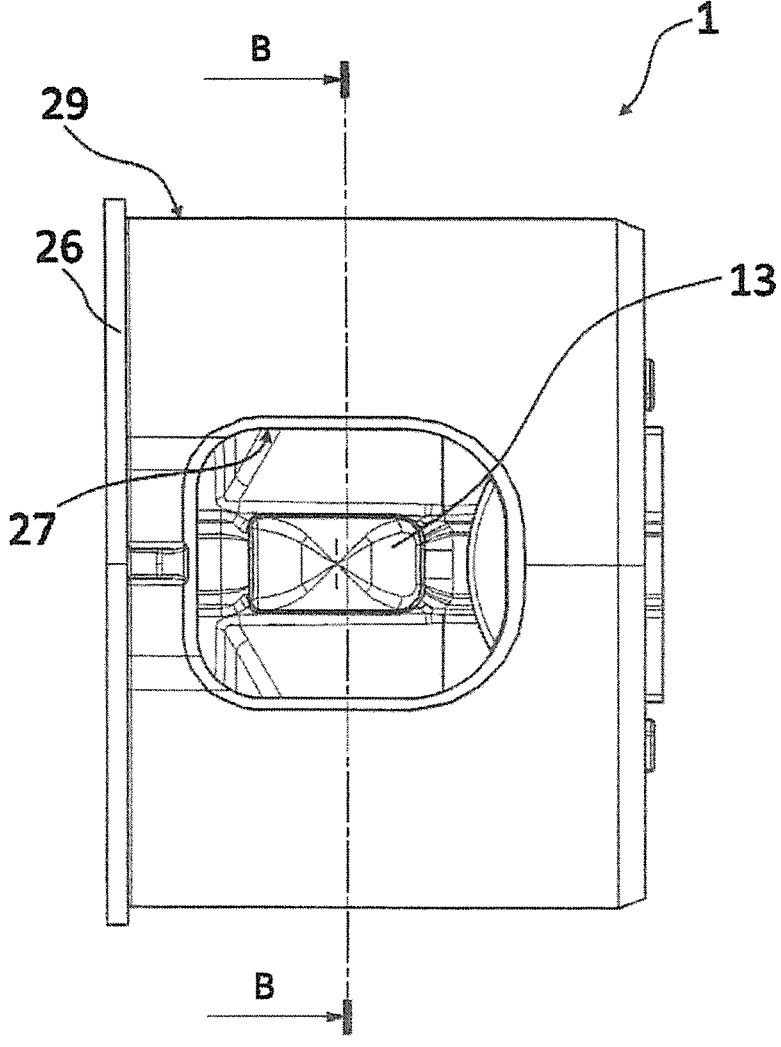
FIG. 3C is a perspective outside view of the exemplary bearing from FIG. 3B.
Figure 3D:
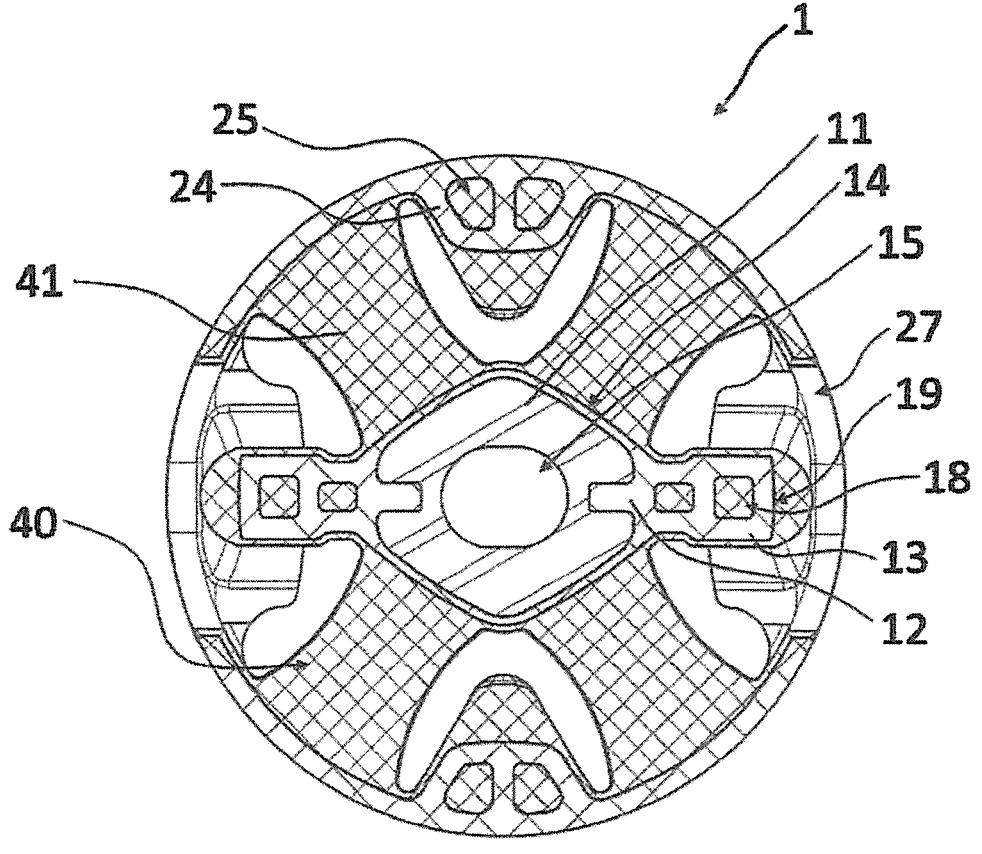
FIG. 3D is a cross-sectional view of the exemplary bearing from FIG. 3C along the sectional plane B-B.

FIG. 3A is a perspective view of an exemplary bearing 1 with an inner core 10, an outer cage 20 and an elastomer body 40, while FIG. 3B is a cross-sectional view of the exemplary bearing 1 along the sectional plane marked A-A in FIG. 3A. FIG. 3C is a perspective outside view of the bearing 1 from FIG. 3B, while FIG. 3D is a cross-sectional view of the exemplary bearing 1 along the sectional plane marked B-B in FIG. 3C.

The exemplary bearing 1 has in particular an exemplary inner core 10 according to FIGS. 1A and 1B. The exemplary bearing 1 further has in particular an exemplary outer cage 20 according to FIGS. 2A and 2B.

The bearing 1 can in particular be configured to resiliently couple at least one first element or first component (not shown) with at least one second element or second component (not shown) and/or to transmit mechanical vibrations between the at least one first element and the at least one second element in a damped manner. The first element can thereby be connected in particular at least to the fastening portion 15 of the inner core 10. The second element can be connected in particular at least to the radial outer circumferential face 29 of the outer cage 20 or to the outer circumferential face of the mounting element 50. The mounting element 50 can also form part of the second element.

The bearing 1 can have a central axis C, wherein the central axis C, in a mounted state of the bearing 1, is substantially identical to the inner core axis A of the inner core 10 and to the outer cage axis B of the outer cage 20.

In the mounted state, the inner core 10 is in particular surrounded by the outer cage 20 and resiliently connected thereto via the elastomer body 40. The outer cage 20 surrounds the inner core 10, which is accommodated in the inner core receiver 21, in a radial direction extending circumferentially around the central axis C. Particularly good transmission of mechanical energy, for example of vibration energy, between the inner core 10 and the outer core 20 and a compact form of the bearing 1 can thereby be made possible.

The outer cage 20 has in particular a greater length along the central axis C than a length of the inner core 10 along the central axis C. The inner core 10 is configured, in the mounted state, to protrude in the axial direction along the central axis C at least partially from the outer cage 20, in particular from an axial end of the outer cage 20 which faces away from the inner stop faces 30. The bearing 1 can thereby in particular be adapted to installation space requirements on installation or on mounting of the bearing 1. However, the bearing 1 is not limited to the above configuration but instead can correspondingly be adapted to different installation space requirements that are present.

The outer stop faces 17, in the mounted state, each face an inner stop face 30 such that the respective outer stop faces 17 and inner stop faces 30 can come into contact with one another in the event of a relative axial movement between the inner core 10 and the outer cage 20 along the central axis C. The respective inner stop faces 30 and the respective outer stop faces 17 thereby overlap at least partially in a direction along the central axis C. In particular, the inner stop faces 30 are substantially parallel to the outer stop faces 17 and extend substantially perpendicular and/or transverse to the central axis C.

In particular, the outer stop projections 13, in the mounted state, protrude radially outwards from the outer circumferential face 14 of the inner core 10 at diametral positions corresponding to the inner stop projections 22.

In particular, the inner core 10 and the outer cage 20 do not undercut one another or overlap parallel to the central axis C in one of the two opposite axial directions. Simplified production of the bearing 1 can thereby be made possible. In particular, the inner core 10, during production of the bearing 1, can be inserted into the outer cage 20 or into the inner core receiver 21 of the outer cage 20 linearly from one end, in particular the axial end of the outer cage 20 facing the inner stop faces 30. The inner core 10 and the outer cage 20 can thus be inserted in a simple manner into, for example, a vulcanization tool.

In particular, each window portion 27 is designed so that each outer stop projection 13 is exposed radially on the outside through the respective window portion 27. In particular during production of the bearing 1, in particular during forming of the elastomer body 40, the insertion of radial pushers can thereby be made possible. The elastomer material in the desired form can thus easily be applied to, for example vulcanized onto, each inner stop projection 13 and/or outer stop projection 22.

The bearing 1 is thereby configured such that any imaginary line or straight line, parallel to the central axis C, which intersects the outer cage 20 and/or the inner core 10 (apart from the elastomer body 40 and the mounting element 50 (see e.g. FIGS. 4A to 4C)) either intersects only the outer cage 20 or intersects only the inner core 10 or intersects only an inner stop projection 22 and an outer stop projection 13.

The inner stop faces 30 and the outer stop faces 17 are covered with an elastomeric material of the elastomer body 40, wherein the elastomer body 40 is formed in one piece. In particular, the elastomer body 40 is formed in a single production step, e.g. a single molding, overmolding or vulcanization step. In particular, the elastomer body 40 can thereby be configured to be thicker on the inner stop faces 30, in particular in an overlap region between the respective inner stop projection 22 and the respective outer stop projection 13, than, for example, at the outer stop faces 17. Alternatively, the elastomer body 40 can also be thinner or of the same thickness on the inner stop faces 30, in particular in an overlap region between the respective inner stop projection 22 and the respective outer stop projection 13, than, for example, at the outer stop faces 17.

The outer radial stop faces 19 of the outer stop projections 13 are further covered with an elastomeric material of the elastomer body 40. An additional radial stop of the inner core 10, for example, can thereby be made possible in a simple manner. In particular, the elastomer body 40 can thereby be formed thicker on the outer radial stop faces 19 than, for example, on the outer stop faces 17.

In particular, the elastomer body 40 covers the entire inner circumferential face 28 of the outer cage 20 and the entire outer circumferential face 14 of the inner core 10. A lasting or durable fastening of the elastomer body 40 to the inner core 10 and outer cage 20 and simple production can thereby be ensured.

The elastomer body 40 further has a plurality of spring arms 41, for example four spring arms 41, which are arranged between the inner circumferential face 28 of the outer cage 20 and the outer circumferential face 14 of the inner core 10. The plurality of spring arms 41 can in particular be designed to transmit mechanical vibrations between the inner core 10 and the outer cage 20. A spring and/or vibration damping behavior of the bearing 1 in particular can thereby efficiently be adapted by the orientation and/or shaping and/or relative arrangement of the plurality of spring arms 41.

The elastomer body 40 or the elastomeric material of the elastomer body 40 further covers at least in part the at least one inner radial stop projection 24, wherein the elastomer body 40 can be thicker, for example, on the at least one inner radial stop projection 24 than on the outer stop faces 17. The elastomer body 40 or an elastomeric material of the elastomer body 40 is further accommodated in the first inner core apertures 18 and the second outer cage apertures 25. The elastomer body 40 or an elastomeric material of the elastomer body 40 can further cover an edge of each window portion 27.

Figure 4A:
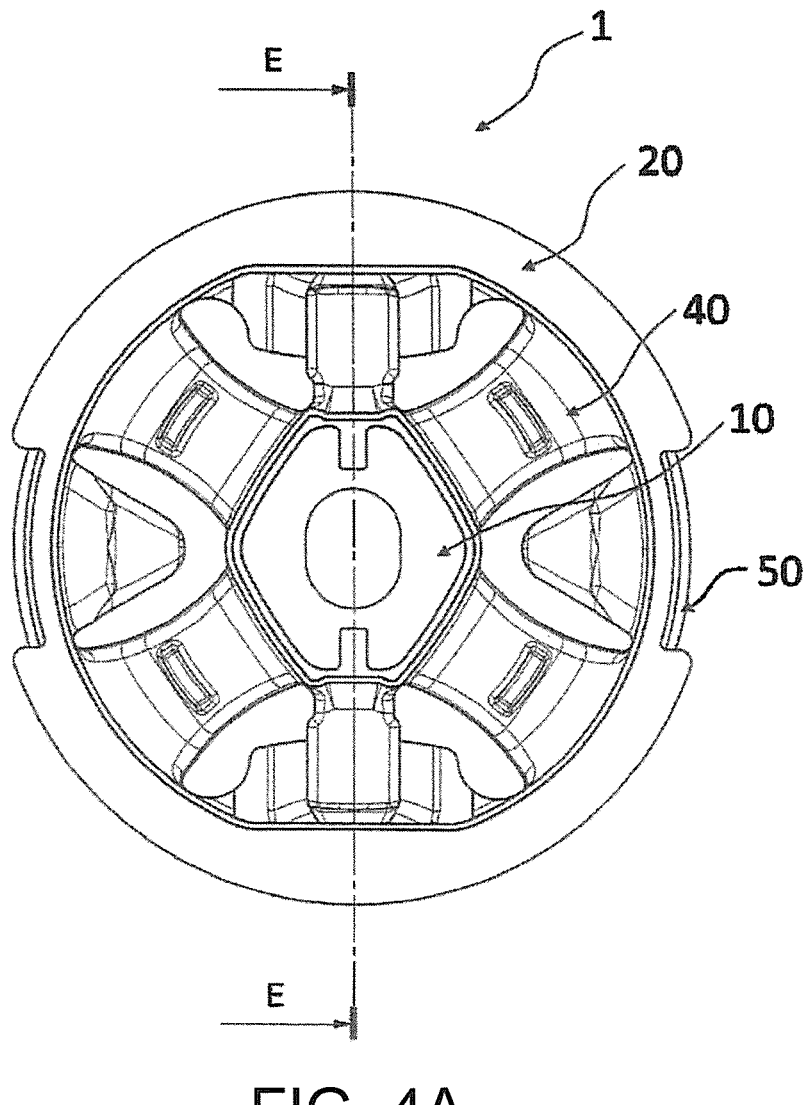
FIG. 4A is a perspective view of an exemplary bearing with an inner core, an outer cage, an elastomer body and a mounting element.
Figure 4B:
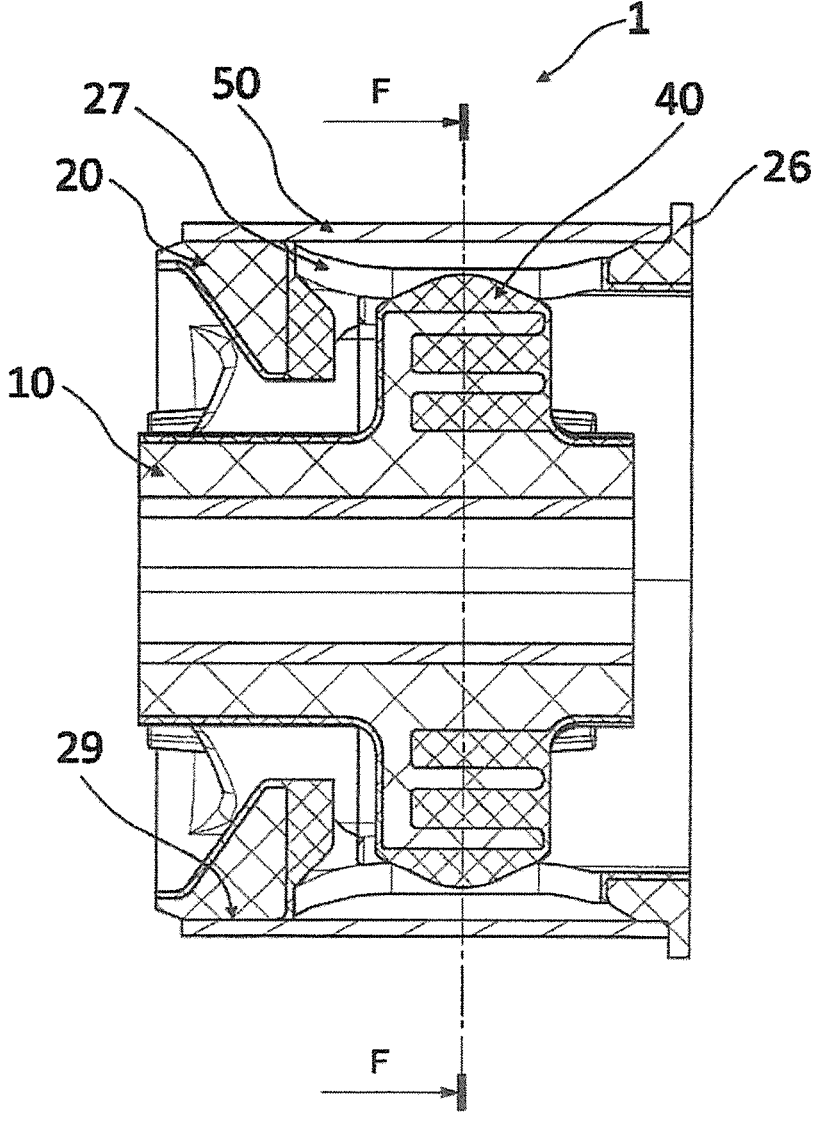
FIG. 4B is a cross-sectional view of the exemplary bearing from FIG. 4A along the sectional plane E-E.
Figure 4C:
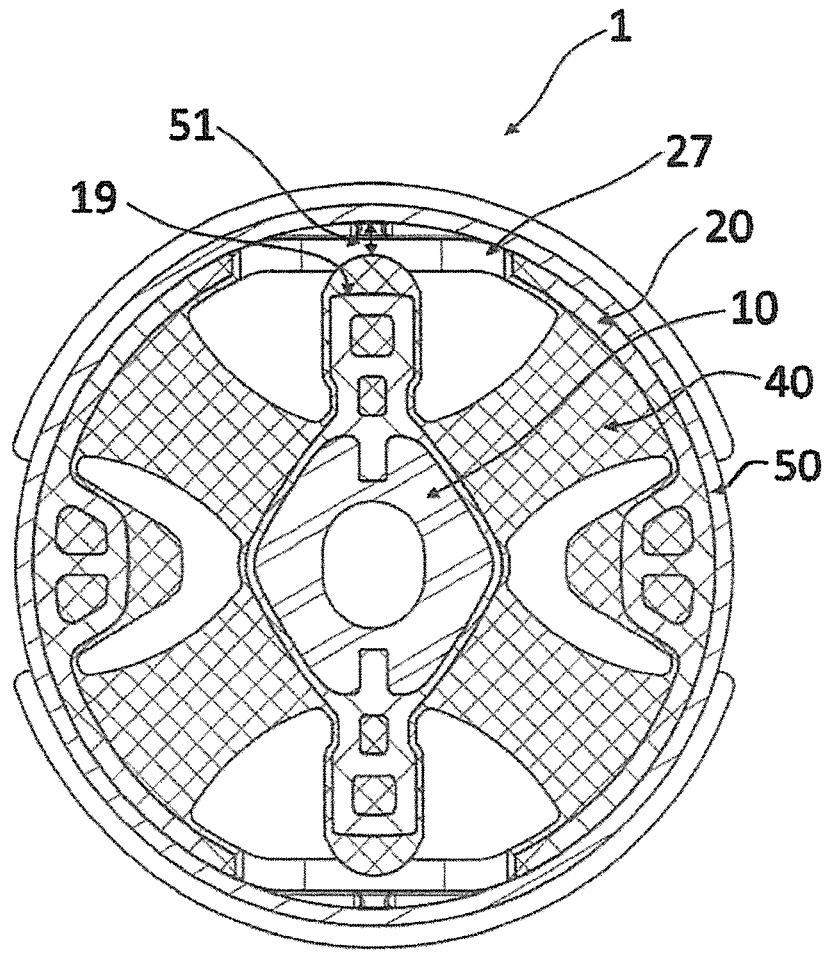
FIG. 4C is a cross-sectional view of the exemplary bearing from FIG. 4B along the sectional plane F-F.

FIG. 4A is a perspective view of an exemplary bearing 1 with an inner core 10, an outer cage 20, an elastomer body 40 and a mounting element 50, while FIG. 4B is a cross-sectional view of the exemplary bearing 1 along the sectional plane marked E-E in FIG. 4A. FIG. 4C is a cross-sectional view of the exemplary bearing 1 along the sectional plane marked F-F in FIG. 4B.

The exemplary bearing 1 thereby corresponds to the exemplary bearing 1 from FIGS. 3A to 3D, wherein a mounting element 50 is further provided.

The bearing 1 further has a mounting element 50, wherein the outer cage 20 is in particular configured to be able to be fastened to the mounting element 50. In particular, the exemplary mounting element 50 is hollow-cylindrical and in one piece, wherein the outer cage 20 can be fastened in the hollow-cylindrical mounting element 50. The mounting element 50 can be an outer sleeve of the bearing 1. In particular, the mounting element 50 encloses the outer cage 20 radially and closes the window portions 27 radially to the outside. There is thereby formed in particular a radial stop free space 51 between the mounting element 50 and the outer radial stop faces 19 or the elastomer body 40 on the outer radial stop faces 19. The outer radial stop faces 19 are, or the elastomer body 40 on the outer radial stop faces 19 is, in particular designed to come into contact with the mounting element 50 in the event of a relative radial movement between the outer cage 20 and the inner core 10, so as to block or limit such a relative radial movement. In particular, the outer cage 20 is pressed into the exemplary mounting element 50. In particular, the mounting element 50 is further designed to pre-compress or calibrate the outer cage 20, and thus also the elastomer body 40, at least partially. The mounting element 50 can be formed in particular from a substantially rigid material, for example a metal, plastics material and/or composite material.

Figure 5:
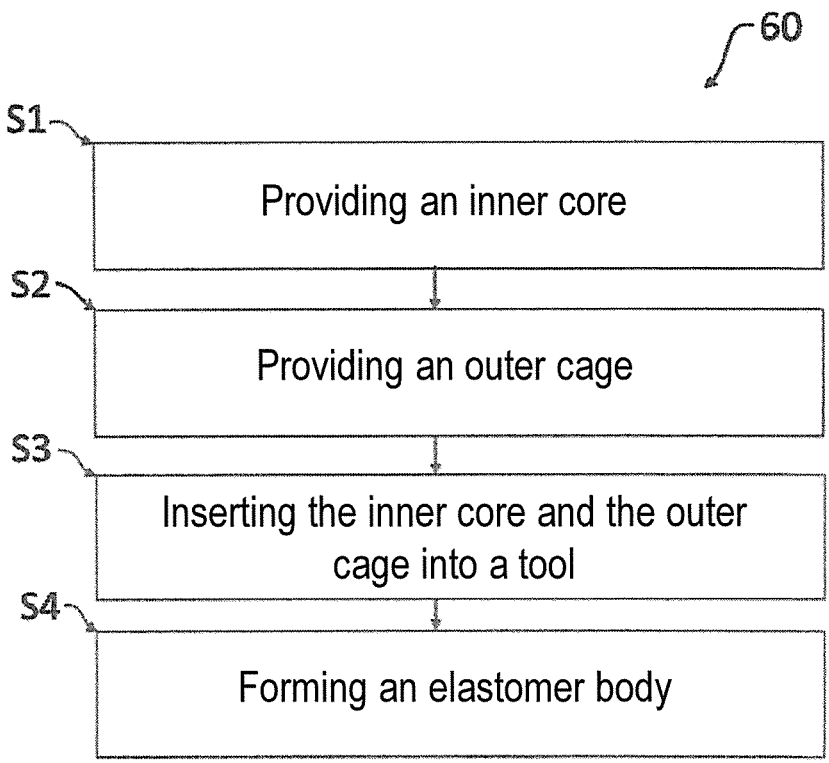
FIG. 5 is a flow diagram of an exemplary method for producing a bearing.

FIG. 5 shows an exemplary method 60 for producing an exemplary bearing 1. The bearing 1 and/or the method 60 can in particular have any desired combination of the features described herein for a bearing or a method.

A first step S1 of the method comprises providing an inner core 10, wherein the inner core 10 has an outer stop projection 13, wherein the outer stop projection 13 protrudes radially outwards from an outer circumferential face 14 of the inner core 10 and has an outer stop face 17. The inner core 10 can in particular have any desired combination of the features described and/or shown herein for an inner core 10.

A second step S2 of the method 60 further comprises providing an outer cage 20, wherein the outer cage 20 has an inner stop projection 22, wherein the inner stop projection 22 protrudes radially inwards from an inner circumferential face 28 of the outer cage 20 and has an inner stop face 30. The outer cage 20 can in particular have any desired combination of the features described and/or shown herein for an outer cage 20.

A third step S3 of the method 60 further comprises inserting the inner core 10 and the outer cage 20 into a tool, such that the outer stop face 17 and the inner stop face 30 are facing and overlap in an axial direction.

A fourth step S4 of the method 60 further comprises forming an elastomer body 40 between the inner core 10 and the outer cage 20 in the tool. Forming can in particular comprise overmolding the inner core 10 and the outer cage 20 with an elastomeric material and then vulcanizing the elastomeric material so as to form the elastomeric body 40, which resiliently connects the inner core 10 and the outer cage 20 together.

The exemplary embodiments described herein and/or shown in the drawings are in particular not to be interpreted as being limiting. Rather, a bearing and a method for producing a bearing can have any desired combination of the features described herein.

What is claimed is:

1. A bearing (1), comprising:
an inner core (10),
an outer cage (20) which surrounds the inner core (10) in a radial direction, and
an elastomer body (40) which resiliently connects the inner core (10) and the outer cage (20) together, wherein
the outer cage (20) comprises at least one inner stop projection (22),
each of the at least one inner stop projection (22) protrudes radially inwards from an inner circumferential face (28) of the outer cage (20) and comprises an inner stop face (30),
the inner core (10) comprises at least one outer stop projection (13),
each of the at least one outer stop projection (13) protrudes radially outwards from an outer circumferential face (14) of the inner core (10) and comprises an outer stop face (17) which faces the inner stop face (30),
the inner stop face (30) and the outer stop face (17) overlap in an axial direction, and
the outer cage (20) comprises a window portion (27) radially on the outside relative to the outer stop projection (13), wherein the inner stop projection (22) is arranged adjacent to the window portion (27),
wherein the outer stop projection (13) and the inner stop projection (22) are positioned in the same radial direction as the window portion (27).

2. The bearing (1) according to claim 1, wherein the inner stop face (30) is substantially parallel to the outer stop face (17) and extends in particular substantially transverse to the axial direction.

3. The bearing (1) according to claim 1, wherein the inner stop face (30) and/or the outer stop face (17) is covered with an elastomeric material of the elastomer body (40).

4. The bearing (1) according to claim 1, wherein the at least one inner stop projection (22) includes two inner stop projections (22), and the at least one outer stop projection (13) includes two outer stop projections (13)
the outer cage (20) comprises the two inner stop projections (22),
the two inner stop projections (22) protrude radially inwards from the inner circumferential face (28) of the outer cage (20) at diametral positions,
the inner core (10) comprises the two outer stop projections (13),
the two outer stop projections (13) protrude radially outwards from the outer circumferential face (14) of the inner core (10) at diametral positions corresponding to the inner stop projections (22), and
the inner stop faces (30) of the two inner stop projections (22) and outer stop faces (17) of the two outer stop projections (13) that face one another overlap in the axial direction.

5. The bearing (1) according to claim 1, wherein the inner core (10) and the outer cage (20) do not undercut one another in an opposite axial direction, which is opposed to the axial direction in which the inner stop face (30) and the outer stop face (17) face one another.

6. The bearing (1) according to claim 1, wherein the window portion (27) is designed so that the outer stop projection (13) is exposed radially on the outside through the window portion (27).

7. The bearing (1) according to claim 1, wherein the outer stop projection (13) comprises at its radially outer end an outer radial stop face (19) which is optionally covered with an elastomeric material of the elastomer body (40).

8. The bearing (1) according to claim 1, wherein the bearing (1) further comprises a mounting element (50), the outer cage (20) is in particular configured so that it can be fastened to the mounting element (50).

9. A method (60) for producing a bearing (1), comprising:

providing an inner core (10), wherein the inner core (10) comprises at least one outer stop projection (13), wherein each of the at least one outer stop projection (13) protrudes radially outwards from an outer circumferential face (14) of the inner core (10) and comprises an outer stop face (17), providing an outer cage (20), wherein the outer cage (20) comprises at least one inner stop projection (22), wherein each of the at least one inner stop projection (22) protrudes radially inwards from an inner circumferential face (28) of the outer cage (20) and comprises an inner stop face (30), and wherein the outer cage (20) comprises a window portion (27) radially on the outside relative to the outer stop projection (13), inserting the inner core (10) and the outer cage (20) into a tool, such that the outer stop face (17) and the inner stop face (30) face one another and overlap in an axial direction and the inner stop projection (22) is arranged adjacent to the window portion (27), and forming an elastomer body (40) between the inner core (10) and the outer cage (20) in the tool, wherein the outer stop projection (13) and the inner stop projection (22) are positioned in the same radial direction as the window portion (27).

10. The method (60) according to claim 9, wherein the window portion (27) is designed so that the outer stop projection (13) is exposed radially on the outside through the window portion (27).

* * * * *